(No Model.)
A. S. PARKE.
SAW SWAGE.
No. 315,539. Patented Apr. 14, 1885.
 
Fig. 1. Fig. 2.
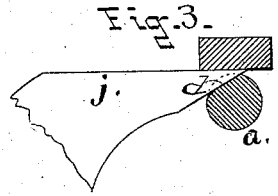 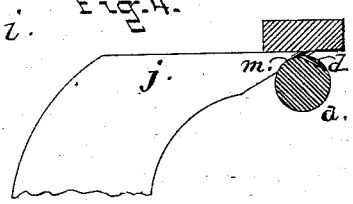 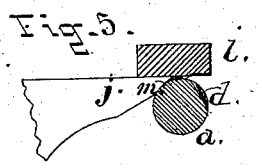
Fig. 3. Fig. 4. Fig. 5.
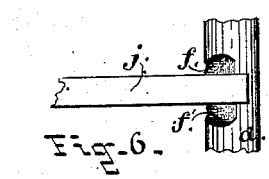 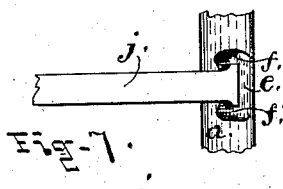 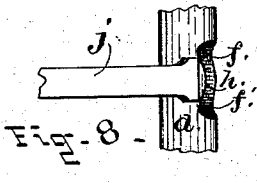
Fig. 6. Fig. 7. Fig. 8.
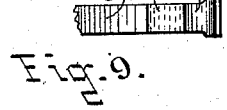
Fig. 9.
ATTEST:
M. R. Thomas
G. P. Thomas
INVENTOR:
Amos S. Parke
by James E. Thomas
Attorney

UNITED STATES PATENT OFFICE.

AMOS S. PARKE, OF BAY CITY, MICHIGAN.

SAW-SWAGE.

SPECIFICATION forming part of Letters Patent No. 315,539, dated April 14, 1885.

Application filed December 19, 1884. (No model.)

*To all whom it may concern:*

Be it known that I, AMOS S. PARKE, a citizen of the United States and a resident of Bay City, in the county of Bay and State of Michigan, have invented a new and useful Improvement in Saw-Swages, of which the following is a specification.

My invention relates to the arrangement and construction of a die which acts upon the saw-tooth near its point, and operates to spread the point of the tooth laterally to a sufficient width at its point to cut a kerf of proper width to give the required clearance for the saw and at the same time to draw out the point of the tooth; and the object of my invention is to provide a means of quickly and accurately fitting up the cutting parts of the saw-tooth without reducing its length, and form a tooth that will cut with great ease and accuracy. I attain these objects by means of the mechanism illustrated in the accompanying drawings, in which—

Figure 1 is a side view of my improved die. Fig. 2 is a section of the same at $x'$ $x'$. Fig. 3 shows a section of the die as applied to a saw-tooth before swaging. Fig. 4 is the same with the tooth partly swaged. Fig. 5 is the same when the tooth is entirely swaged. Fig. 6 is a plan view of the tooth and die shown in Fig. 3. Fig. 7 is the same of Fig. 4. Fig. 8 is the same of Fig. 5. Fig. 9 shows the under side of a tooth when finished.

Similar letters refer to similar parts throughout the several views.

A represents a small shaft of hardened steel, of which one end, $b$, is arranged with plane faces or other suitable means for attaching a lever thereon with which to rock or rotate the said shaft. $c$ and $c'$ are journals which rest in a suitable clamping-block which is properly attached to the saw. The part $d$ between the journals $c$ and $c'$ is cut away to form a die, a portion, $e$, of the die having a flat or level surface, while the parts $f$ and $f'$ are still farther cut out, leaving the part $h$ raised in the center considerably above the sides $f$ and $f'$, and the whole is slightly rounded to meet the outside surface of the rounded part of the back of the die. Above the die is rigidly secured to the clamping-jaws, which supports the die, a press block or anvil, $i$. The said supporting-jaws are firmly clamped to the saw with the anvil $i$ resting upon one edge of the tooth $j$, and with the flattened surface $e$ of the die bearing on the opposite edge of the said tooth $j$ in such a manner that the raised portion $h$ shall be directly in the center of the tooth and at the side toward the throat of the said tooth, as shown in Figs. 3 and 6. The die is then rolled toward the point of the tooth, and the raised part $h$ is pressed into the tooth, forming a recess, $m$, and the material displaced by forming the said recess is moved forward and spread out, making the tooth at its point of greater width than its body, as shown in Figs. 4 and 7. The die on being still farther rotated draws or rolls out the point of the tooth and leaves an even chisel-edge, as shown in Figs. 5 and 8, which may be easily fitted up by one or two strokes of the file and without reducing the length of the tooth, as with the means usually employed, and also leaves them with a clean cutting-edge and a strong support for the corners thereof.

Having fully described my improvement, what I claim as my invention, and desire to secure by Letters Patent, is—

1. In a die for swaging saw-teeth, a shaft arranged with journals near its ends for supporting the same, as described, one end of the said shaft extending beyond the said journal and arranged to receive a lever or means of rotating the said shaft, and having a portion between the said journals with a flat or level surface, and with the sides of one portion of the said surface cut away to form a raised part in the center thereof, substantially as shown, and for the purpose described.

2. In a saw-swage, the combination of the anvil $i$, arranged to rest against one edge of the tooth, with a die, $e$, located and arranged to rest against the opposite edge of the said tooth, and provided with a level surface, $e$, and the raised and rounded portion $h$, substantially as described, and for the purpose set forth.

AMOS S. PARKE.

Witnesses:
G. N. FRANCIS,
J. E. THOMAS.